United States Patent [19]
Arnst

[11] Patent Number: 5,498,813
[45] Date of Patent: Mar. 12, 1996

[54] IN SITU FORMATION OF CORROSION INHIBITORS

[75] Inventor: Theodore C. Arnst, Bellaire, Tex.

[73] Assignee: Nalco Chemical Company, Naperville, Ill.

[21] Appl. No.: 369,948

[22] Filed: Jan. 9, 1995

[51] Int. Cl.⁶ ............................................. C07C 2/70
[52] U.S. Cl. .................. 585/466; 585/451; 585/709; 585/718; 585/721; 585/732
[58] Field of Search .................. 585/372, 721, 585/466, 718, 451

[56] References Cited

U.S. PATENT DOCUMENTS

| | | | |
|---|---|---|---|
| 2,854,497 | 9/1958 | Piehl | 585/732 |
| 3,038,017 | 6/1962 | Ayers et al. | 585/718 |
| 3,371,127 | 2/1968 | Cabanaw et al. | 585/718 |
| 3,467,729 | 9/1969 | Rodgers | 585/718 |
| 3,887,635 | 6/1975 | Parker et al. | 585/721 |
| 4,024,050 | 5/1977 | Shell et al. | 208/48 AA |
| 5,326,924 | 7/1994 | Kisalus | 585/721 |

*Primary Examiner*—Sharon Gibson
*Attorney, Agent, or Firm*—Robert A. Miller; James J. Drake

[57] ABSTRACT

Alkyl alcohols are added to the effluent from hydrocarbon reactions using phosphoric acid based catalysts to prevent corrosion in metallic pipes and vessels downstream of the reactor. The alcohol is believed to react with phosphoric acid present in the hydrocarbon stream to produce a mixture of phosphate esters which act as corrosion filmers to prevent corrosion. The high boiling points of the phosphate esters allow for the separation of useful product from the phosphate ester corrosion inhibitors.

8 Claims, No Drawings

/* 5,498,813 */

IN SITU FORMATION OF CORROSION INHIBITORS

INTRODUCTION

This application discloses and claims a method for reducing corrosion occurring in petrochemical processing plants downstream of alkylation units employing phosphoric acid based catalyst materials.

Phosphoric acid is used as a catalyst for certain alkylation reactions in the processing of petrochemicals. Phosphoric acid is used as a catalyst promoter in the alkylation of $C_4$–$C_6$ aliphatic hydrocarbons by $C_3$–$C_5$ olefins to produce gasoline stocks. Other phosphoric acid based catalyst systems include but are not limited to the production of cumene from benzene and propylene using what is variously termed solid phosphoric acid heterogeneous catalysts such as $SiP_2O_7$. One of the characteristics of phosphoric acid catalysts is that while insoluble in hydrocarbons, small amounts of water present in the reactants may solubilize minor amounts of phosphoric acid, resuking in corrosion occurring to pipes and vessels downstream of the unit where the catalyst is used.

The phosphoric acid present may rapidly corrode piping, storage vessels, and reactors if the phosphoric acid is not neutralized. Neutralization of the phosphoric acid can be accomplished through the use of various additives including caustic, amines, and the like. Many of these additives have been employed with varying degrees of success. Caustic, while neutralizing phosphoric acid, may create a corrosion problem in and of itself if overfed. In addition, the reaction product of caustic and phosphoric acid, sodium phosphate is insoluble and may deposit on the interior surfaces of lines and pipes potentially causing poor heat transfer rand plugged lines. In addition, caustic is only sparingly soluble in hydrocarbons, and as a result is difficult to admix with the hydrocarbon stream to be treated in a manner to insure contact of phosphoric acid with the neutralizing agent without the addition of excessive quantities of water, which should also be avoided.

Amines, while useful for neutralizing the acidic components in a petroleum stream, including phosphoric acid suffer from some of the same deleterious properties as caustic, solubility in the hydrocarbon stream being treated, and the potential formation of insoluble amine salts. Another disadvantage of volatile amine neutralizers is that they can potentially enter a recycle stream that goes back to the reactor where they destroy the activity of the catalyst.

Accordingly, it would be an advance to the art if a method could be found for neutralizing phosphoric acid containing hydrocarbon streams with an additive that was soluble in the stream, would admix into the stream, and which would form a reaction product that would not create problems in the further processing of the petroleum stream, I have found that when alkyl alcohols, and especially $C_8$–$C_{12}$ alcohols are added to hydrocarbon streams exiting a phosphoric acid catalyst treatment the alcohols react with the phosphoric acid, forming what is believed to be a phosphate ester material. Further, the phosphate ester materials formed in-situ are analogous of materials that are known to be effective corrosion inhibitors and antifoulants. Examples of phosphate esters that are used as antifoulants and corrosion inhibitors are exemplified in U.S. Pat. No. 4,024,050, the specification of which is hereinafter incorporated by reference into this publication. The phosphoric acid/long chain alcohol reaction products form a hydrocarbon soluble material with extraordinary properties, an alkyl chain with a polar functionality that tends to bind molecularly to any metal surfaces that it contacts. This invention therefore converts a corrosive agent (phosphoric acid) to a filmer that protects the metal surfaces from corrosive attack, and converts any excess polyphosphoric acid into a hydrocarbon soluble byproduct that goes away with the heavy hydrocarbon residuals.

It is therefore an object of this invention to provide to the art a method of treating the hydrocarbon effluent from a phosphoric acid or polyphosphoric acid catalyst alkylation unit to neutralize potentially corrosive phosphoric acid contained in the hydrocarbon effluent using an alkyl alcohol containing from 4–20 and preferably 6–12 carbon atoms. Further objects will appear hereinafter.

DETAILED DESCRIPTION OF THE INVENTION

Phosphoric acid is used as a strong acid alkylation promoter in the alkylation of olefins with alkanes, and in the alkylation of benzene to produce cumene. In the alkylation of olefins with alkanes, a strong acid, generally sulfuric or phosphoric acid is used. The acid is intimately mixed with the hydrocarbon stream at elevated temperature. Following the reaction, the resultant unstable emulsion is broken, the phosphoric acid recovered, and the alkylated reaction product, containing small amounts of water is sent for further processing.

In the practice of this invention, from 1.0–4.0 mole of a $C_6$–$C_{22}$ alcohol are added to a hydrocarbon stream containing phosphoric acid per each mole of phosphoric acid.

Often the alcohol is added downstream of a hydrocarbon processing unit which employs a phosphoric acid based catalyst. The alcohol reacts with the phosphoric acid carried in the feed or stream existing in the unit, helping to prevent corrosion on the surfaces of metallic liner vessels in contact with such hydrocarbon stream.

In another embodiment of the invention, the alcohol is added to a hydrocarbon stream which has been subjected to alkylation conditions in an alkylation reactor employing a phosphoric acid or phosphoric acid containing catalyst. The alcohol reacts with the phosphoric acid in the stream helping to prevent corrosion on metallic lines and vessels in contact with the liquid hydrocarbon.

Phosphoric acid may be mounted on diactomaceous earth or silica gel. This process to make so called polymer gasoline has been used since the mid 1930's and typically operates at a temperature of about 50°–260° C. and preferably 200°–230° C. and at a pressure of about 3 to 7 MPa using an acid strength of 100 to 115 percent $H_3PO_4$ plus some dissolved $P_2O_5$ which is a viscous liquid under these conditions). This catalyst may also be used for olefin hydration. The properties of the catalyst are markedly affected by concentration, and water may be added to the feed to maintain the acid concentration at the desired level. The alkylation of benzene with propylene to produce cumene is also well known. This process, using a so called solid phosphoric acid catalyst process is believed to account for 80–90% of the worlds cumene production and is generally referred to as the UOP vapour-phase cumene process. In this process, chemical grade propylene or a propylene cut containing up to 60% by weight of propane and benzene, are mixed and fed into a reactor where they are brought into contact with a catalyst consisting of phosphoric acid supported on kieselguhr or pumice. The reaction is conducted at elevated temperatures, generally 200°–250° C. with a pressure range of 15–35 bar. An excess of benzene in the molecular ratio of 5:1 benzene to propylene is maintained in order to suppress dialkylation, oligomerization and other side reactions and attain a high conversion rate. The gases from the reactor are used to heat incoming feed before entering the recycle column where any unreacted benzene is recovered and recycled. The remainder of the liquid stream is fed into the cumene distillation column where heavy by-products such as di and tri isopropyl benzene are recovered as bottoms while pure cumene passes overhead.

In the practice of this invention, it is preferred to inject the alkyl alcohol material into the hydrocarbon stream immediately upon its leaving the reactor, or, if that feed is too hot, immediately after a first stage condenser. In this way, the alcohol is allowed to react with the phosphoric acid contained in the stream exiting the reactor so that corrosion protection can be immediately initiated.

Heterogeneous catalysts containing solid phosphoric acid such as $SiP_2O_7$ and phosphoric acid impregnated over diatomaceous earth may also be used for the synthesis of propene oligomers, utilized as gasoline components, for the detergent industry, and as raw materials in oxo-synthesis.

Feedstocks contacting heterogeneous catalysts contain water which is necessary for the function of the catalyst. It has been reported that under typical industrial conditions, the water content of the reactor inlet can range from 200 to 1000 wt. ppm in the case of propene oligomerization and from 50 to 300 ppm in the case of cumene synthesis. This water dissolves small amounts of phosphoric acid from the catalyst, and renders the feed leaving the catalyst reactor corrosive.

In the practice of this invention sufficient alkyl alcohol is added to react with all, or substantially all of the phosphoric acid carded over into the feed in a ratio to provide for a significant yield of the diester material, although small amounts of mono or tri-ester materials are satisfactory. As such, from 1.0–4.0 moles and preferably 1.5–3.0 moles of alkyl alcohol should be added for each mole of phosphoric, or polyphosphoric acid present in the hydrocarbon stream. Most preferably, 2.0 moles of alkyl alcohol should be added for each mole of phosphoric or polyphosphoric acid present in the hydrocarbon stream. In most situations, a dosage of from 5–500 ppm (wt.) and preferably 10–250 ppm (wt.) of the alkyl alcohol is sufficient. Most preferably, about 50–150 ppm (wt) of alkyl alcohol is added to the hydrocarbon stream at a point downstream of the reactor containing the phosphoric acid catalyst.

In order to illustrate the invention, the following examples are presented:

Example I

A sample of spent catalyst (hereinafter Catalyst "A") was acquired from a site downstream of the reactor in a cumene production unit. The catalyst used in the reactor was silicon pyrophosphate $SiP_2O_7$. The spent catalyst was mostly soluble in water. By virtue of elemental analysis of the spent catalyst, the water insoluble portions of the spent catalyst are presumed to be corrosion by-products, iron phosphate, nickel phosphate and chromium phosphate.

5.0 grams of Catalyst "A" was mixed with 5.0 g. of a commercially available mixture of $C_8$–$C_{10}$ alcohols (Alfol 810 available from the Vista Chemical Company) in a beaker on a hot plate until the catalyst melted (approx 55°–65° C.). It was observed that the catalyst dissolved or reacted with the alkyl alcohol mixture to form a continuous phase. When cooled, the resultant material remains as one continuous phase with the exception of a small amount of suspended solids. To the resultant mixture was added 75 ml of kerosene. After mixing, the resultant materials were completely miscible evidencing the formation of a phosphate ester soluble in the hydrocarbon phase.

Example 2

1.0 gram of Catalyst "A" was added to each of 6 vials along with approximately 5 g of xylene. To the vials were then added 0, 0.1, 0.2, 0.5, 0.8, and 1.0 gram respectively of the alkyl alcohol mixture noted above. The vials were placed on a hot plate and heated until the catalyst was visually observed to melt (approx. 60° C.). Each vial was shaken and then removed from the heat. The vial containing no alcohol exhibited two phases on cooling, the xylene phase being water white. The sample containing 0.1 g of alcohol mixture turned a light green-brown color but most of the catalyst remained on the bottom of the vial. The sample containing 0.2 g of alcohol turned a darker shade of green-brown, with a majority of catalyst remaining on the bottom of the vial. The sample with 0.5 g of alcohol turned a very dark brown color with some residue on the bottom of the vial. The samples containing 0.8 and 1.0 g of alcohols also turned very dark.

After cooling, the top phase of each sample containing 0.5 g of alcohol or more was decanted into a separate vial. There was noted more catalyst in the bottom of the vial containing 0.5 g of alcohol while the 0.8 and 1.0 g alcohol sample appearing about the same. An additional aliquot of approximately 0.5 g of alcohol mixture was added to each vial. Only a faint fight green-brown color formed. It is speculated that the deposits are the corrosion product's residue that are present in the spent catalyst. From these experiments, it is estimated that the stoichiometry to disperse the catalyst appears to be 0.5:1 to 1:1.

It would be expected that the alkyl alcohol reacted with the phosphoric acid present in the catalyst to produce hydrocarbon soluble phosphate ester materials. It would be expected that most of the phosphoric acid present was convened to the $C_{8-C12}$ di-ester although some monoester, and tri-ester materials were also expected to have been formed. It would be expected that the phosphate ester materials formed would coat the inside of any metallic flow line or reactor to which they were added, providing corrosion protection to the metallic flow line or reactor. It would be expected that the phosphate ester materials produced in-situ in metallic hydrocarbon transfer lines and reactors would act as a corrosion preventative. It would be expected that any phosphate ester formed which did not adhere to a metallic hydrocarbon transfer line or reactor would pass through the line and would later be recovered as a bottom material in further processing.

Example 3

The following represents a hypothetical example which is believed to accurately illustrate the advantage of the invention. 75 ppm (wt) of Alfol 810 would be added to the hydrocarbon effluent emerging from a cumene reactor employing a solid phosphoric acid catalyst. After several weeks of use, it would be noted that less corrosion had occurred downstream of the reactor in metallic transfer lines and vessels than prior to the addition of the alcohol mixture. That cumene product could be readily separated by distillation from the high boiling phosphate ester materials.

Having thus disclosed my invention, I claim:

1. A method for the prevention of corrosion occurring downstream of a hydrocarbon alkylation reactor employing a phosphoric acid based catalyst which corrosion is caused by phosphoric acid in the hydrocarbon stream, which comprises adding to the hydrocarbon stream at a point downstream of said reactor from 1.0–4.0 moles of a $C_6$–$C_{22}$ alkyl alcohol per each mole of phosphoric acid present in the hydrocarbon stream.

2. The method of claim 1 wherein the phosphoric acid based catalyst is a solid phosphoric acid catalyst.

3. The method of claim 1 wherein the phosphoric acid based catalyst is phosphoric acid and the phosphoric acid is separated from the hydrocarbon feed prior to discharge from the reactor.

4. The method of claim 1 wherein the phosphoric acid based catalyst is phosphoric acid deposited on diatomaceous earth.

5. The method of claim 1 wherein from 1.5–3.0 moles of alkyl alcohol are added per each mole of phosphoric acid present in the hydrocarbon stream.

6. A method for the in-situ formation of a corrosion inhibitor useful to protect metallic lines and vessels in contact with a hydrocarbon stream which has been subjected to alkylation conditions in an alkylation reactor using a phosphoric acid based catalyst which comprises adding to the hydrocarbon stream, at a point downstream of said reactor, from 1.0–4.0 moles of a $C_6$–$C_{22}$ alkyl alcohol per mole of phosphoric acid present in the hydrocarbon stream, whereby the phosphoric acid reacts with the alcohol to produce a corrosion inhibiting amount of a phosphate ester material.

7. The method of claim 6 wherein from 1.5–3.0 moles of alkyl alcohol are added per mole of phosphoric acid present in the hydrocarbon stream.

8. The method of claim 6 wherein the alkyl alcohol is added to the stream at a temperature of from 50° C. to 260° C.

* * * * *